United States Patent
Ohigashi et al.

(10) Patent No.: US 9,643,659 B2
(45) Date of Patent: May 9, 2017

(54) VEHICLE BODY FRONT SECTION STRUCTURE

(71) Applicant: Nissan Motor Co., Ltd., Kanagawa (JP)

(72) Inventors: Akira Ohigashi, Kanagawa (JP); Tomoyuki Kaneda, Kanagawa (JP); Yukio Morita, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 14/902,474

(22) PCT Filed: Jun. 19, 2014

(86) PCT No.: PCT/JP2014/066288
§ 371 (c)(1),
(2) Date: Dec. 31, 2015

(87) PCT Pub. No.: WO2015/001973
PCT Pub. Date: Jan. 8, 2015

(65) Prior Publication Data
US 2017/0001669 A1    Jan. 5, 2017

(30) Foreign Application Priority Data

Jul. 2, 2013 (JP) .................................. 2013-138613

(51) Int. Cl.
*B60N 99/00* (2006.01)
*B62D 25/20* (2006.01)
(Continued)

(52) U.S. Cl.
CPC ....... *B62D 25/2018* (2013.01); *B62D 25/088* (2013.01); *B62D 25/14* (2013.01); *B62D 25/2036* (2013.01); *B62D 25/2045* (2013.01)

(58) Field of Classification Search
CPC .. B62D 25/2018; B62D 25/088; B62D 25/15; B62D 25/2036; B62D 25/2045
See application file for complete search history.

(56) References Cited

U.S. PATENT DOCUMENTS

2005/0140179 A1    6/2005  Morsch et al.
2010/0171340 A1*   7/2010  Yasuhara ............... B62D 21/11
                                                                296/205
(Continued)

FOREIGN PATENT DOCUMENTS

JP      S61-71577 U     5/1986
JP      S62-181976 A    8/1987
(Continued)

OTHER PUBLICATIONS

International Preliminary Report on Patentability issued in corresponding International Application No. PCT/JP2014/066288, mailed on Jan. 7, 2016 (11 pages).

*Primary Examiner* — Lori L Lyjak
(74) *Attorney, Agent, or Firm* — Osha Liang LLP

(57)  ABSTRACT

A vehicle body front section structure has a floor tunnel that projects into a vehicle interior on an underfloor of a vehicle, that is formed in a vehicle longitudinal direction, and that has a floor tunnel front end part disposed at a vehicle front of the floor tunnel, and floor tunnel members, a front end ridge line part, a first vehicle body front section reinforcing member that covers, from an outside of the vehicle, a whole of the floor tunnel front end part, from a vehicle upper end to a root of each of the floor tunnel members, and that is provided in the vehicle longitudinal direction along the front end ridge line part, and front side members, each of which has a lower end root that is connected to a dash panel, and each of which extends forward from the lower end root.

11 Claims, 8 Drawing Sheets

(51) Int. Cl.
*B62D 25/08* (2006.01)
*B62D 25/14* (2006.01)

(56) References Cited

U.S. PATENT DOCUMENTS

| | | | | |
|---|---|---|---|---|
| 2010/0237659 A1* | 9/2010 | Ishigame | ............. | B62D 21/157 |
| | | | | 296/204 |
| 2012/0212009 A1* | 8/2012 | Ishizono | ............. | B62D 25/025 |
| | | | | 296/193.07 |

FOREIGN PATENT DOCUMENTS

| JP | H05-270443 A | 10/1993 |
|---|---|---|
| JP | H06-25414 Y2 | 7/1994 |
| JP | 2006-193086 A | 7/2006 |
| JP | 2009-248593 A | 10/2009 |
| JP | 2010-264906 A | 11/2010 |

\* cited by examiner

VEHICLE BODY FRONT SECTION STRUCTURE

CROSS-REFERENCE TO RELATED APPLICATIONS

This application is a national stage application of PCT/JP2014/066288 filed Jun. 19, 2014, and claims priority to Japanese Patent Application No. 2013-138613 filed on Jul. 2, 2013, and the entire contents thereof which are incorporated herein by reference in their entirety.

BACKGROUND

Technical Field

The present invention relates to a vehicle body front section structure.

Related Art

For example, Patent Literature 1 has referred to a floor cross member set for the purpose of improving collision performance, particularly front surface collision performance. In such a Patent Literature 1, a vehicle body front section structure is configured so as to take a shape to cover a dash panel and a floor connecting part from an inside of a vehicle interior by the floor cross member, and so as to continuously connect among side sills.

Accordingly, according to a structure of Patent Literature 1, sufficient vehicle body rigidity can be secured in order to suppress vehicle body deformation of a cabin at the time of front surface collision, and collision energy can be absorbed in a wide range using even side sill parts.

CITATION LIST

Patent Literature

Patent Literature 1: U.S. Patent No. 2005-0140179A1

SUMMARY OF INVENTION

Incidentally, in a vehicle body structure, a peripheral structure from a dash panel to a floor tunnel is one of important structure portions that affect collision, sound vibration, and driving stability performance, respectively. Particularly, when the sound vibration performance is improved (reduction of a noise level in a vehicle interior), joint rigidity between the dash panel and the floor tunnel is important. As for the sound vibration performance, particularly in a frequency range of 100 to 200 Hz of road noise, engine booming noise, etc., deformation (hereinafter referred to as crushing deformation) occurs in which a front end part of the floor tunnel collapses in a lateral direction. As a result, a mode in which a front floor vertically vibrates is excited by the crushing deformation, change in volume of air in the vehicle interior occurs, and the noise level in the vehicle interior increases.

In the structure of Patent Literature 1, a space between a side surface of the floor tunnel and the floor cross member is small, and a cross section sufficient to suppress the crushing deformation is not sufficiently secured. Therefore, the side surface of the floor tunnel to suppress the crushing deformation does not have sufficient rigidity, and additionally, a frame structure of the floor cross member cannot disperse a force acting on a floor tunnel member at the time of the crushing deformation. As a result, the structure of Patent Literature 1 causes vehicle body deformation to thereby increase the noise level in the vehicle interior.

One or more embodiments of the present invention provides a vehicle body front section structure that can suppress vehicle body deformation to thereby improve sound vibration performance.

The vehicle body front section structure according to one or more embodiments of the present invention includes a floor tunnel formed in a vehicle longitudinal direction so as to project into a vehicle interior on an underfloor of the vehicle, and a first vehicle body front section reinforcing member that covers, from an outside of the vehicle, a whole of a floor tunnel front end part being a vehicle front of the floor tunnel, from a vehicle upper end to a root of each floor tunnel member provided in the vehicle longitudinal direction along a front end ridge line part.

DETAILED DESCRIPTION

Hereinafter, embodiments of the present invention will be explained in detail with reference to drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
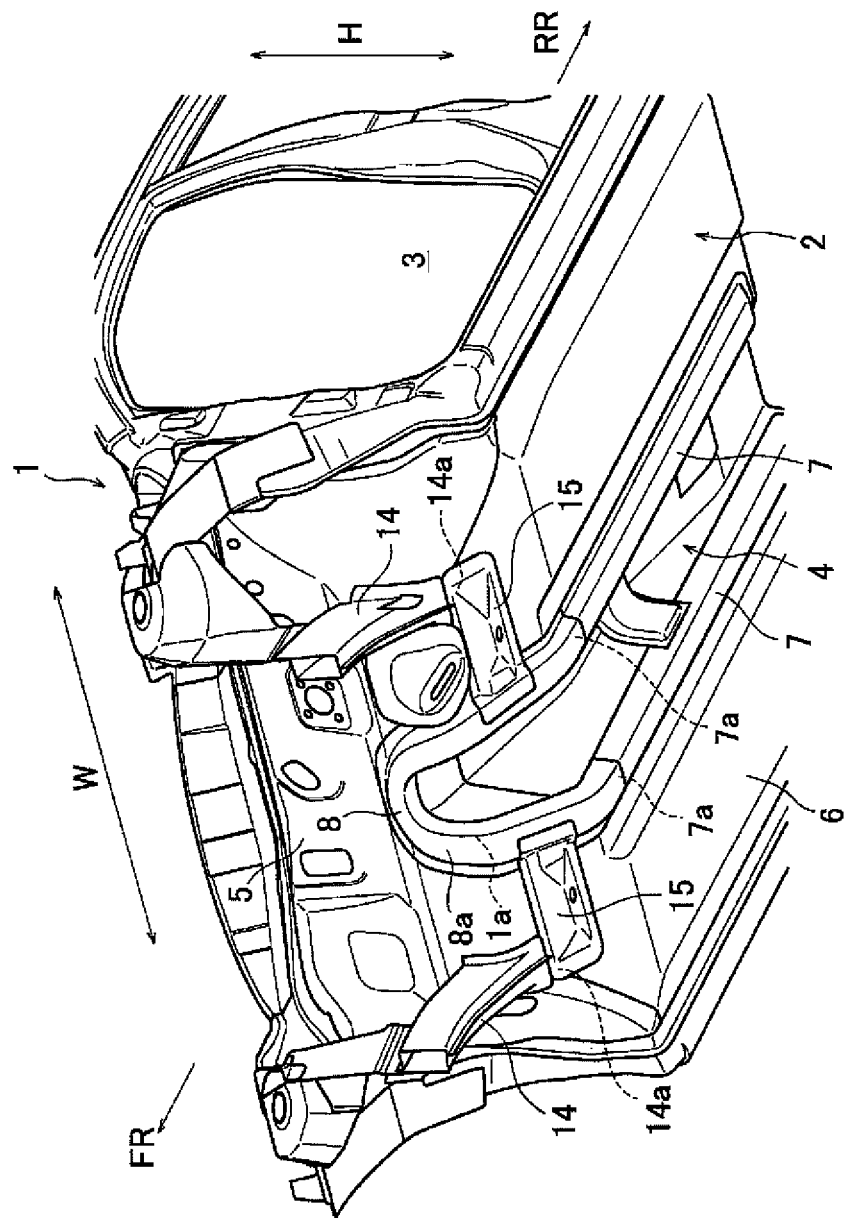
FIG. 1 is a perspective view showing structures of a front section and a lower section seen from an outside of a vehicle in a vehicle body front section structure according to one or more embodiments of the present invention.
Figure 2:
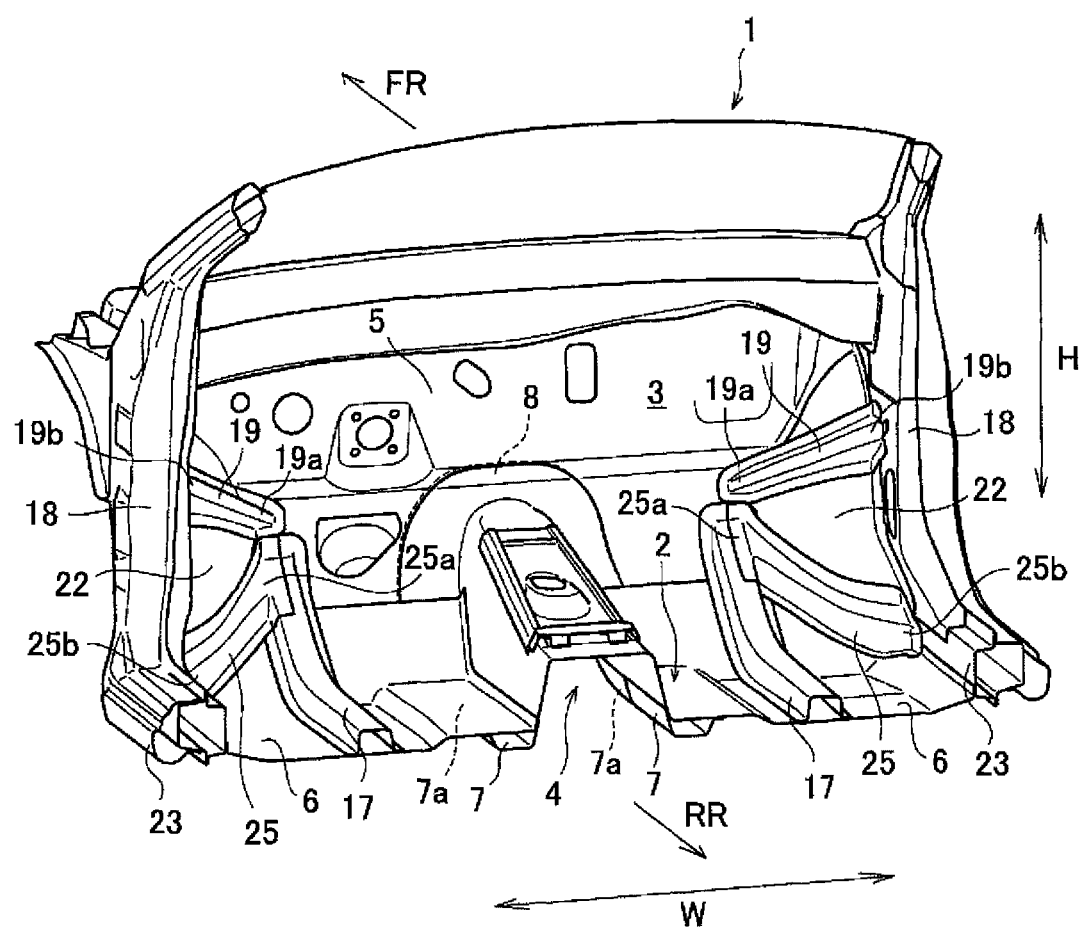
FIG. 2 is a perspective view showing a structure in a vehicle interior of the vehicle body front section structure according to one or more embodiments of the present invention.

FIG. 1 is a perspective view showing structures of a front section and a lower section seen from an outside of a vehicle in a vehicle body front section structure seen from the outside of the vehicle (a perspective view in a case of looking up at a vehicle lower section from a position of a vehicle front lower part). FIG. 2 is a perspective view showing a structure in a vehicle interior of the vehicle body front section structure (a perspective view in a case of looking into an inside of the vehicle interior from a position of a side surface of the vehicle). Note that in FIGS. 1 and 2, an arrow FR indicates a vehicle front, an arrow RR a vehicle rear, an arrow H a vehicle height, and an arrow W a vehicle width direction, respectively.

A floor tunnel 4 is formed on an underfloor 2 of a vehicle body 1 so as to project into a vehicle interior 3. The floor tunnel 4 is continuously formed on a center in the vehicle width direction W along a vehicle longitudinal direction from a portion where a dash panel 5 and a floor panel 6 cross with each other to the vehicle rear RR. A front end ridge line part 1a is located at the portion where the dash panel 5 and the floor panel 6 cross with each other, and the dash panel 5 and the floor panel 6 are coupled to each other by the front end ridge line part 1a. Four reinforcing members (first to fourth vehicle body front section reinforcing members) for reinforcing strength in a front end portion of the floor tunnel 4 are provided in this vehicle body 1, and these four reinforcing members constitute a part of the vehicle body front section structure.

First, a U-shaped member 8, which is the first vehicle body front section reinforcing member included in the vehicle body front section structure, is attached to a front end part of the floor tunnel in a vehicle front FR direction of the floor tunnel 4 from the outside of the vehicle as shown in FIG. 1. The U-shaped member 8 is attached so as to cover the front end ridge line part 1a from the outside of the vehicle. The U-shaped member 8 covers a whole of a front end ridge line part 1a from an end of the vehicle upper end side of the front end ridge line part 1a toward roots 7a of a pair of floor tunnel members 7 provided in the vehicle longitudinal direction. The pair of floor tunnel members 7 couple the floor tunnel 4 to the floor panel 6.

Figure 3:
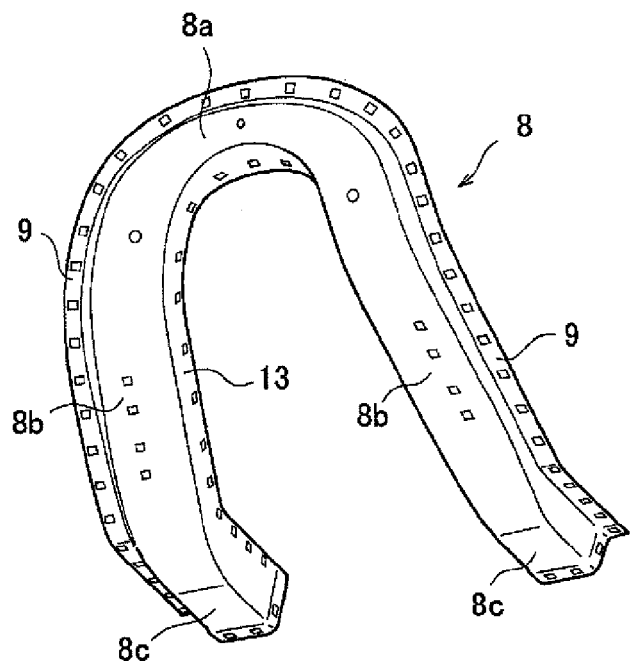
FIG. 3 is an enlarged perspective view of a first vehicle body front section reinforcing member.

As shown in FIG. 3, a whole shape of the U-shaped member 8 is an inverted U-shape that opens to a vehicle lower part, and the U-shaped member 8 has a U-shaped part 8a, a pair of extended parts 8b, and a pair of floor tunnel member connecting parts 8c. The U-shaped part 8a is formed in conformity with a U-shape of the floor tunnel 4, and the pair of extended parts 8b extend from a front end of the U-shaped part 8a, i.e., an end of the vehicle upper end side of the U-shaped part 8a, to the pair of floor tunnel members 7. The floor tunnel member connecting part 8c is provided at a front end of the each extended part 8b. The U-shaped part 8a, the pair of extended parts 8b, and the pair of floor tunnel member connecting parts 8c are integrally formed by press-molding of a steel plate, and they integrally constitute the U-shaped member 8.

As shown in FIG. 3, a connecting part to the vehicle body 1 of the U-shaped member 8 includes three parts of an outer periphery, an inner periphery, and ends.

Figure 4:
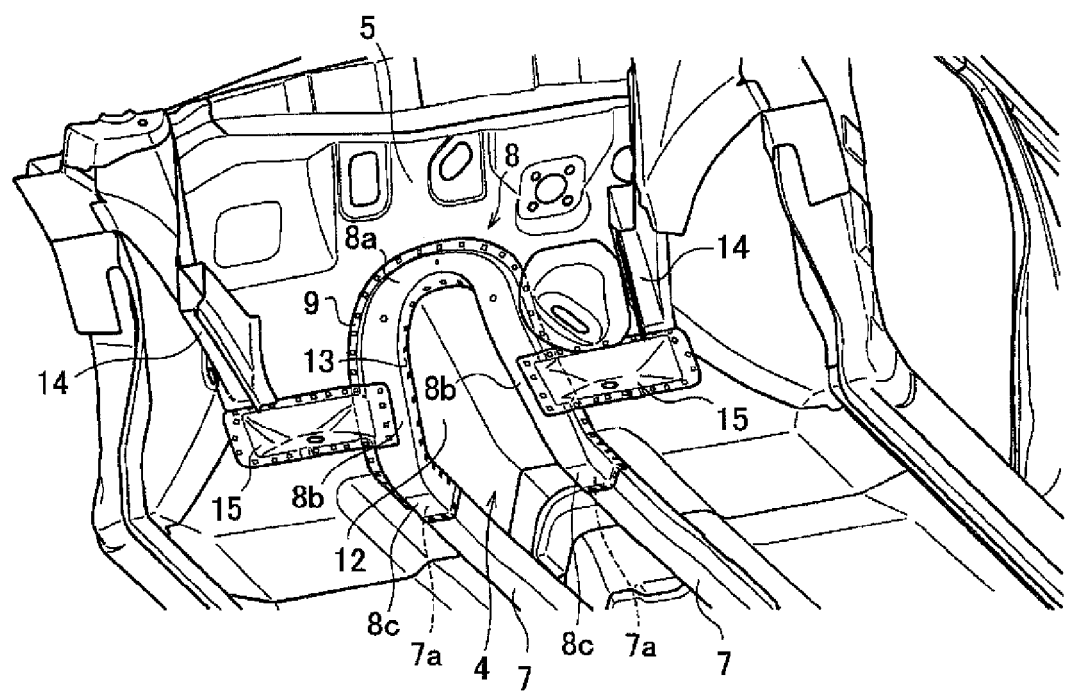
FIG. 4 is a perspective view showing an enlarged portion in which the first vehicle body front section reinforcing member is attached to a floor tunnel front end part.
Figure 5:
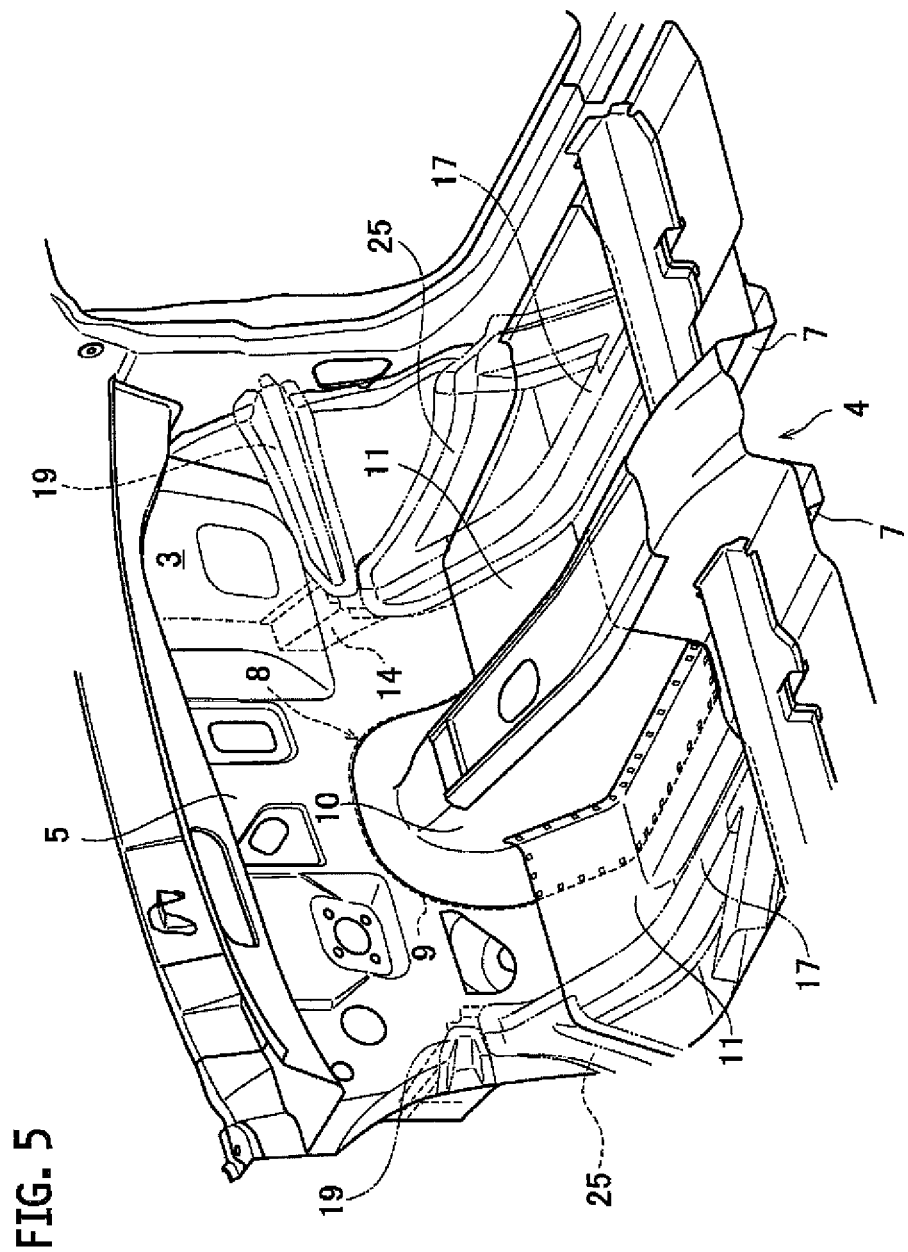
FIG. 5 is an enlarged perspective view showing a portion in which each portion of the first vehicle body front section reinforcing member is attached to the floor tunnel front end part.

A flange 9 integrally formed therein that continues the U-shaped part 8a, the pair of extended parts 8b, and the pair of floor tunnel member connecting parts 8c are integrally formed at the U-shaped member 8. The flange 9 corresponds to the outer periphery of the connecting part to the vehicle body 1 of the U-shaped member 8. As shown in FIGS. 4 and 5, the outer periphery of the U-shaped member 8 is divided into a portion where three of the dash panel 5, a floor tunnel front end panel 10, and the flange 9 are stacked and connected, and a portion where two of a front floor panel 11 and the flange 9 are stacked and connected.

In addition, a bent part 13 made into a shape conforming to a front end side surface part 12 of the floor tunnel 4 is integrally formed at the U-shaped member 8. The bent part 13 corresponds to the inner periphery of the connecting part to the vehicle body 1 of the U-shaped member 8. The bent part 13 is spot-welded and connected to the above-mentioned front end side surface 12 of the floor tunnel 4.

In addition, the pair of floor tunnel member connecting parts 8c are integrally formed at the U-shaped member 8. The pair of floor tunnel member connecting parts 8c correspond to the ends of the connecting part to the vehicle body 1 of the U-shaped member 8. The floor tunnel member connecting parts 8c are spot-welded and connected to the roots 7a, which are front end parts of the floor tunnel members 7. The floor tunnel member connecting parts 8c are connected so as to cover the roots 7a of the floor tunnel members 7.

The U-shaped member 8 connected to the vehicle body 1 as described above covers the front end ridge line part 1a in conformity with a shape of the front end part of the floor tunnel, and the U-shaped member 8 also has a structure directly coupled to the floor tunnel members 7.

Figure 6:
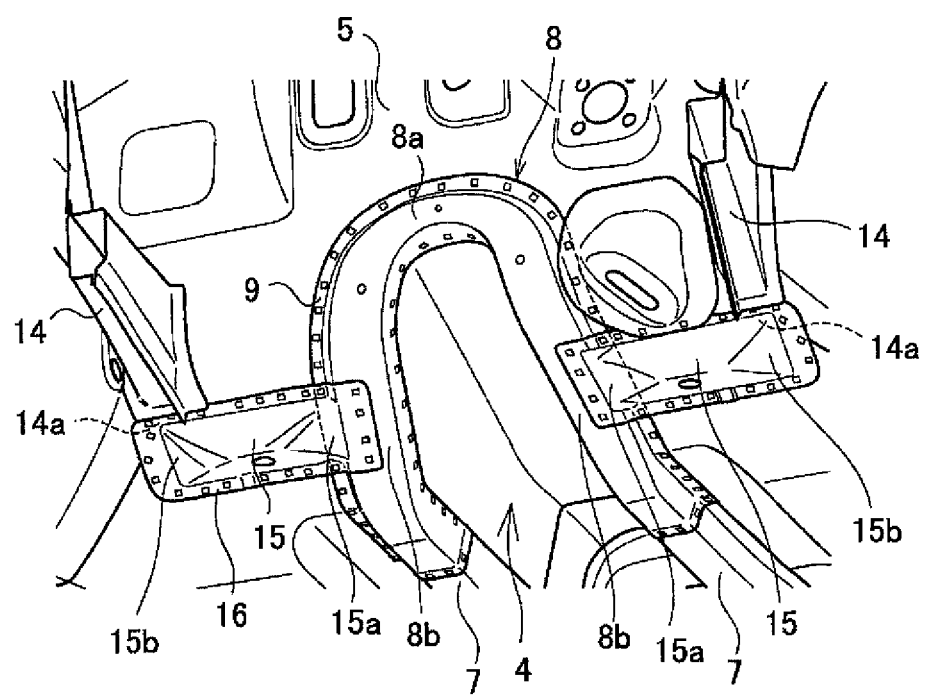
FIG. 6 is an enlarged perspective view of a second vehicle body front section reinforcing member.
Figure 7:
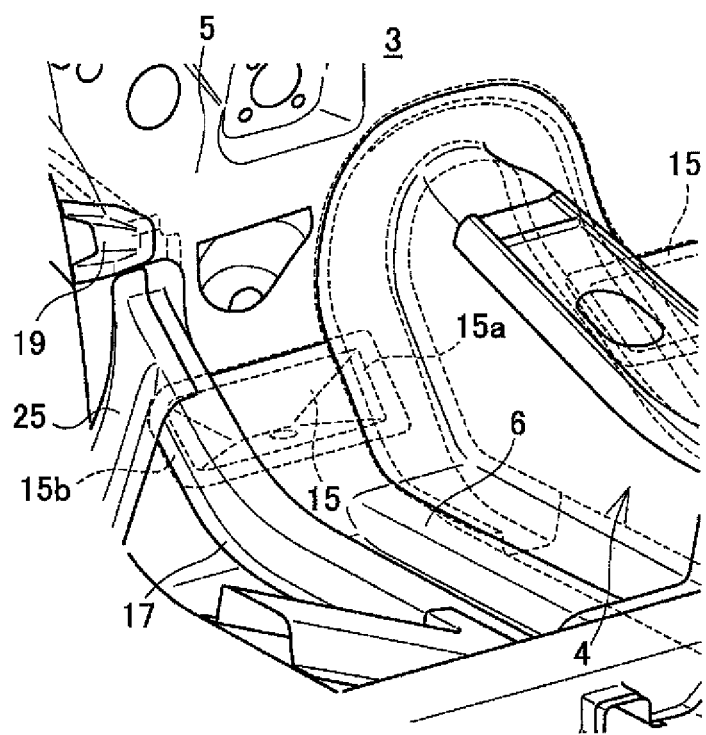
FIG. 7 is a perspective view showing that the second vehicle body front section reinforcing member is coupled to a vehicle interior on-floor member provided in an interior.

A pair of dash lower cross members 15, which are the second vehicle body front section reinforcing member, couple the U-shaped member 8 to lower end roots 14a of a pair of front side members 14 provided in the vehicle longitudinal direction as shown in FIGS. 1, 6 and 7. Further, the pair of dash lower cross members 15 are fixed also to the dash panel 5.

Flanges 16 are formed on whole outer peripheries of the dash lower cross members 15, the flanges 16 are spot-welded, and thereby the dash lower cross members 15 are connected to the U-shaped member 8, the lower end roots 14a of the front side members 14, and the dash panel 5. Namely, the dash lower cross members 15 are connected to the vehicle body 1 through the flanges 16 of the dash lower cross members 15.

One ends 15a of the dash lower cross members 15 having a rectangular shape in a plane view (ends of the flanges 16 located on the near side of the floor tunnel 4) are spot-welded and connected to the extended parts 8b of the U-shaped member 8. In addition, the other ends 15b of the dash lower cross members 15 (ends of the flanges 16 located on the far side of the floor tunnel 4) are spot-welded and connected to the roots 14a of the front side members 14. The other ends 15b of the dash lower cross members 15 are connected also to vehicle interior on-floor members 17 provided in accordance with the roots 14a of the front side members 14 as shown in FIGS. 6 and 7. Additionally, portions excluding the one ends 15a and the other ends 15b of the flanges 16 of the dash lower cross members 15 are spot-welded and connected to the dash panel 5.

Figure 8:
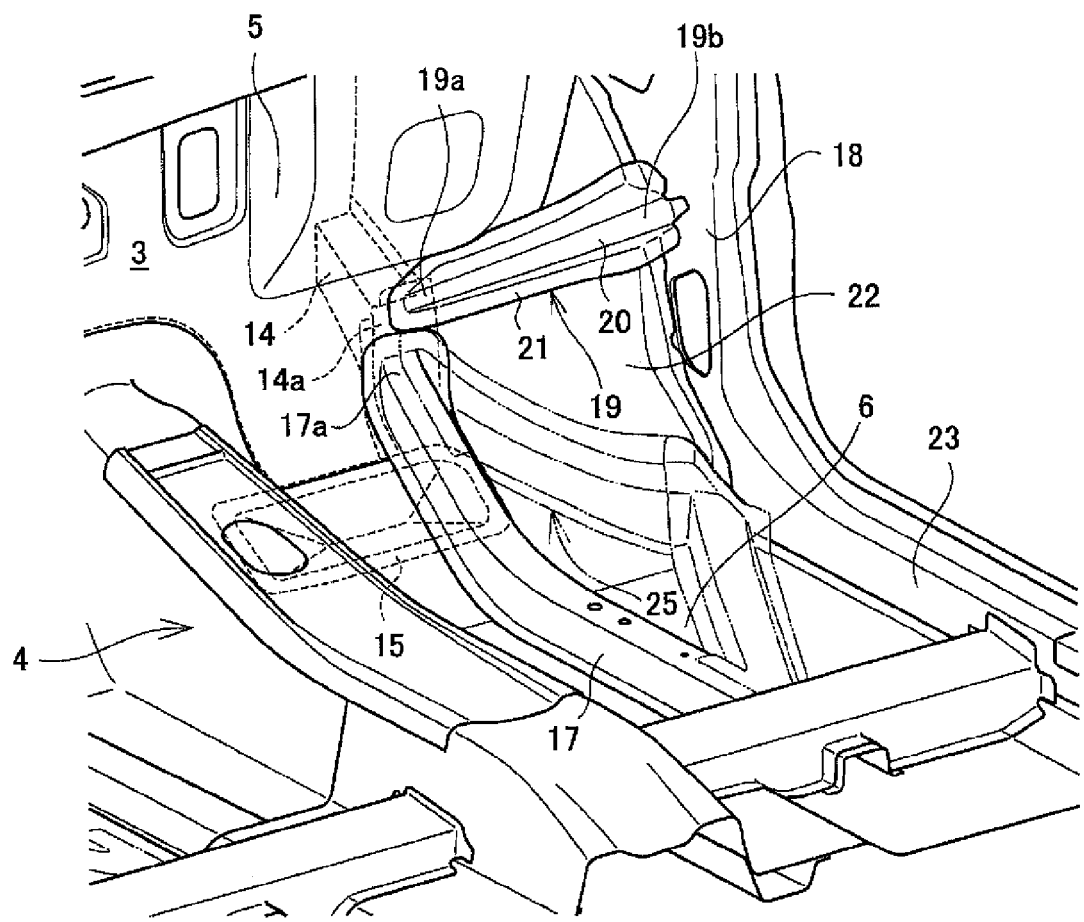
FIG. 8 is an enlarged perspective view of a third vehicle body front section reinforcing member.

A pair of upper dash cross members 19, which are the third vehicle body front section reinforcing member, continuously couple vicinities of the lower end roots 14a of the pair of front side members 14 to a pair of dash side panels 18 as shown in FIGS. 2 and 8.

The upper dash cross members 19 each have a body 20 having a cross-section of substantially trapezoidal shape, and a flange 21 formed on an outer periphery of the body 20. One ends 19a of the upper dash cross members 19 each having a rectangular shape in a plane view (ends of the flanges 21 located on the near sides of the floor tunnel 4) are spot-welded and connected to the dash panel 5 near the lower end roots 14a of the front side members 14. In addition, other ends 19b of the upper dash cross members 19 (ends of the flanges 21 located on the far sides of the floor tunnel 4) are spot-welded and connected to the dash side panels 18. Additionally, portions excluding the one ends 19a and the other ends 19b of the flanges 21 of the upper dash cross members 19 are spot-welded and connected to wheel house panels 22.

Note that the upper dash cross members 19 may be provided on the outside of the vehicle, and that the one ends 19a of the upper dash cross members 19 may be connected to the dash lower cross members 15.

Figure 9:
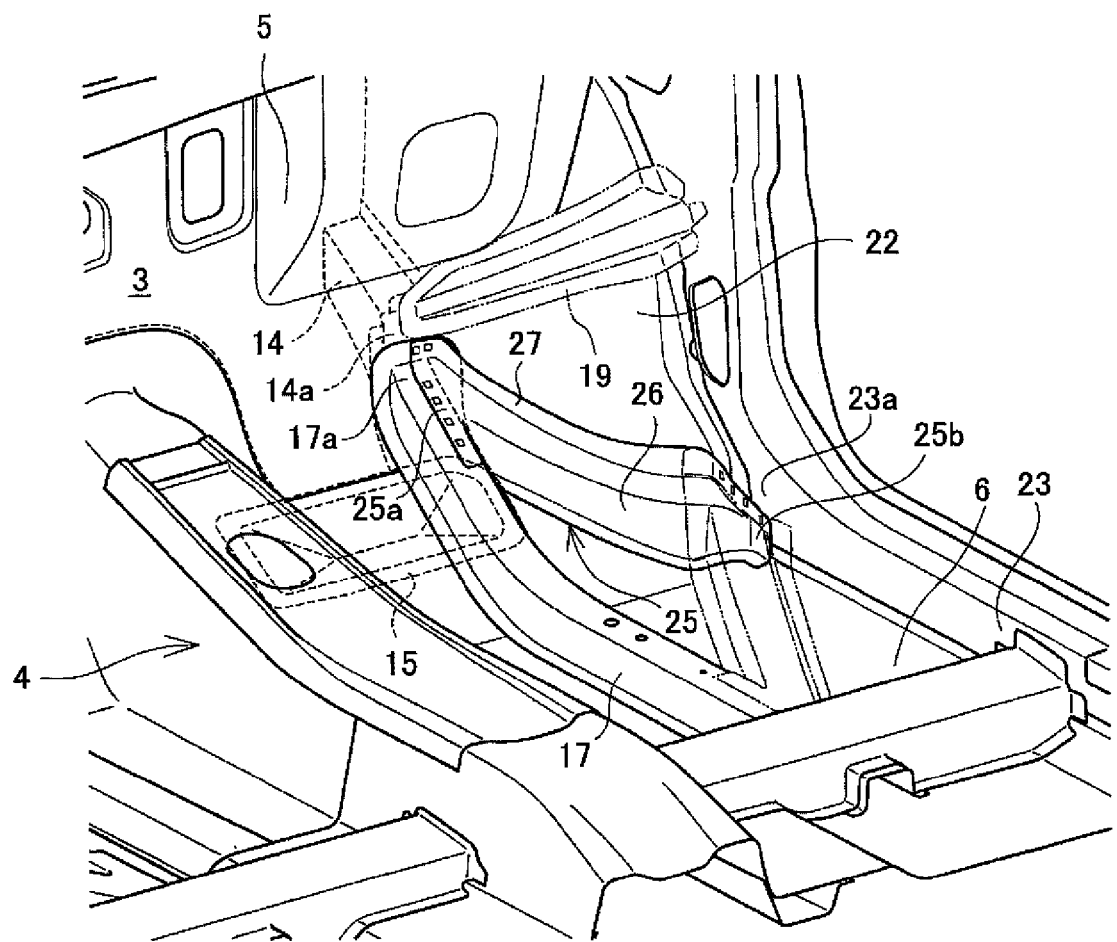
FIG. 9 is an enlarged perspective view of a fourth vehicle body front section reinforcing member.

A pair of lower dash cross members 25, which are the fourth vehicle body front section reinforcing member, continuously couple the lower end roots 14a of the pair of front side members 14 to vehicle front end parts 23a of a pair of side sills 23 as shown in FIGS. 2 and 9.

The lower dash cross members 25 each have a body 26 having a rectangular shape in a plane view, and a flange 27 formed on an outer periphery of the body 26. One ends 25a of the lower dash cross members 25 (ends of the flanges 27 located on the near sides of the floor tunnel 4) are spot-welded and connected to the front end parts 17a of the vehicle interior on-floor members 17 provided in accordance with the lower end roots 14a of the front side members 14. In addition, the other ends 25b of the lower dash cross members 25 (ends of the flanges 27 located on the far sides of the floor tunnel 4) are spot-welded and connected to the vehicle front end parts 23a of the side sills 23. Additionally, portions excluding the one ends 25a and the other ends 25b of the flanges 27 of the lower dash cross members 25 are spot-welded and connected to the wheel house panels 22.

Note that the lower dash cross members 25 may be provided on the outside of the vehicle, and that the one ends 25a of the lower dash cross members 25 may be connected to the dash lower cross members 15.

The outside of the vehicle of the vehicle body front section structure including the first to fourth vehicle body front section reinforcing members mentioned above is configured so that the U-shaped member 8 covers a whole of a floor tunnel front end part and is connected to the floor tunnel members 7, and so that the dash lower cross members 15 are connected to the U-shaped member 8 and the roots 14a of the front side members 14. For this reason, the vehicle body front section structure is configured so that the U-shaped member 8 is connected to frame members which are the floor tunnel members 7, and so that the dash lower cross members 15 are connected to frame members which are the front side members 14.

In addition, an inside of the vehicle interior of the vehicle body front section structure including the first to fourth vehicle body front section reinforcing members has a structure that the upper dash cross members 19 are connected to the frame members which are the front side members 14 and also to the dash side panels 18, and that the lower dash cross members 25 are connected to frame members which are the vehicle interior on-floor members 17 and the side sills 23.

According to the vehicle body front section structure according to one or more embodiments of the present invention, since the U-shaped member 8 which is the first vehicle body front section reinforcing member directly covers the whole of a floor tunnel front end part, strength at the front end of the floor tunnel 4 can be improved. As a result, vehicle body deformation can be suppressed, and sound vibration performance can be improved.

Namely, according to the vehicle body front section structure according to one or more embodiments of the present invention, since the first vehicle body front section reinforcing member enhances rigidity of the floor tunnel front end part, shear and a torsional stress due to crushing deformation of the floor tunnel front end part can be directly suppressed. As a result, the vehicle body deformation is suppressed, and the sound vibration performance is improved.

In addition, since the U-shaped member 8 is connected to frame members which are the floor tunnel members 7, the floor tunnel members 7 can be used as a part of a frame structure, and an external force input to the vehicle body 1 can be stress dispersed to the floor tunnel members 7. Hereby, a shear stress and a torsional input which cause crushing deformation in which the floor tunnel front end part collapses in a lateral direction in a frequency range of 100 to 200 Hz of road noise, engine booming noise, etc. are dispersed to the floor tunnel members 7 via the U-shaped member 8, and as a result, crushing deformation occurring at the floor tunnel front end part can be suppressed.

In addition, according to the vehicle body front section structure according to one or more embodiments of the present invention, since the dash lower cross members 15, which are the second vehicle body front section reinforcing members, are connected to the frame members which are the front side members 14, the front side members 14 can be used as a part of the frame structure, and an external force generated in the floor tunnel 4 can be stress dispersed to the front side members 14. In addition, since the dash lower cross members 15 are connected to the U-shaped member 8, strength of the floor tunnel front end part is improved by these dash lower cross members 15 and U-shaped member 8. In addition, since the dash lower cross members 15 are connected to the lower dash cross members 25 through the vehicle interior on-floor members 17 so as to stress disperse to those members.

In addition, according to the vehicle body front section structure according to one or more embodiments of the present invention, since the upper dash cross members 19, which are the third vehicle body front section reinforcing members, are coupled to the vicinities of the lower end roots 14a of the front side members 14, the front side members 14 can be used as the part of the frame structure, and an external force input to the vehicle body can be stress dispersed to the front side members 14. In addition, since the upper dash cross members 19 are coupled to the dash side panels 18, the external force generated in the floor tunnel 4 can be dispersed to the dash side panels 18.

In addition, according to the vehicle body front section structure according to one or more embodiments of the present invention, since the lower dash cross members 25, which are the fourth vehicle body front section reinforcing members, are connected to the lower end roots 14a of the front side members 14, the front side members 14 can be used as the part of the frame structure, and the external force generated in the floor tunnel 4 can be stress dispersed to the front side members 14. In addition, since the lower dash cross members 25 are connected to the side sills 23, the external force generated in the floor tunnel 4 can be dispersed to the side sills 23 through the lower dash cross members 25.

In addition, since the lower dash cross members 25 are coupled to the vehicle interior on-floor members 17 provided in accordance with the lower end roots 14a of the front side members 14, the vehicle interior on-floor members 17 can be used as a part of the frame structure, and the external force generated in the floor tunnel 4 can be stress dispersed to the vehicle interior on-floor members 17.

By the above-mentioned stress dispersion, the external force input to the vehicle body 1 is dispersed to the whole of a frame structure included in the vehicle body, and the external force that was input does not concentrate on specific portion. Particularly, the force generated in the floor tunnel 4 is dispersed, and such crushing deformation that the floor tunnel front end part and the floor tunnel 4 collapse in the lateral direction can be suppressed. Since a deformation mode of the frame structure accompanied by a change in volume of air in the vehicle interior is suppressed, increase of a noise level in the vehicle interior can be effectively suppressed.

Although embodiments of the present invention are explained above, the embodiments are merely examples to facilitate understanding of the present invention, and the present invention is not limited to the above embodiments. A technical scope of the present invention is not limited to specific technical matters disclosed in the above-described embodiments, and various deformations, changes, alternative technologies, etc. that can be derived from the technical matters are also included.

One or more embodiments of the present invention can be utilized for a vehicle having a floor tunnel.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST 1 vehicle
2 underfloor
4 floor tunnel
5 dash panel
6 floor panel
7 floor tunnel member
8 U-shaped member (first vehicle body front section reinforcing member)
14 front side member
15 dash lower cross member (second vehicle body front section reinforcing member)
17 vehicle interior on-floor member
18 dash side panel
19 upper dash cross member (third vehicle body front section reinforcing member)
22 wheel house panel
23 side sill
25 lower dash cross member (fourth vehicle body front section reinforcing member)

The invention claimed is:

1. A vehicle body front section structure, comprising:
a floor tunnel that projects into a vehicle interior on an underfloor of a vehicle, that is formed in a vehicle longitudinal direction, and that comprises:
a floor tunnel front end part disposed at a vehicle front of the vehicle tunnel, and floor tunnel members;
a front end ridge line part;
a first vehicle body front section reinforcing member that covers, from an outside of the vehicle, a whole of the floor tunnel front end part, from a vehicle upper end to a root of each of the floor tunnel members, and that is provided in the vehicle longitudinal direction along the front end ridge line part;
front side members, each of which comprises a lower end root that is connected to a dash panel, and each of which extends forward from the lower end root; and
a second vehicle body front section reinforcing member that couples the first vehicle body front section reinforcing member to the lower end root of the front side member.

2. The vehicle body front section structure according to claim 1,
wherein the first vehicle body front section reinforcing member is connected to the floor tunnel member.

3. The vehicle body front section structure according to claim 1, comprising:
a third vehicle body front section reinforcing member that continuously couples a vicinity of the lower end root of each of the front side members to a dash side panel part.

4. The vehicle body front section structure according to claim 1, comprising:
a fourth vehicle body front section reinforcing member that continuously couples the lower end root of each of the front side members to a vehicle front end part of a side sill.

5. The vehicle body front section structure according to claim 1, comprising:
a fourth vehicle body front section reinforcing member that continuously couples a vehicle interior on-floor member provided in accordance with the lower end root of each of the front side members to a vehicle front end part of a side sill.

6. The vehicle body front section structure according to claim 2, comprising:
a third vehicle body front section reinforcing member that continuously couples a vicinity of the lower end root of each of the front side members to a dash side panel part.

7. The vehicle body front section structure according to claim 2, comprising:
a fourth vehicle body front section reinforcing member that continuously couples the lower end root of each of the front side members to a vehicle front end part of a side sill.

8. The vehicle body front section structure according to claim 3, comprising:
a fourth vehicle body front section reinforcing member that continuously couples the lower end root of each of the front side members to a vehicle front end part of a side sill.

9. The vehicle body front section structure according to claim 2, comprising:
a fourth vehicle body front section reinforcing member that continuously couples a vehicle interior on-floor member provided in accordance with the lower end root of each of the front side members to a vehicle front end part of a side sill.

10. The vehicle body front section structure according to claim 3, comprising:
a fourth vehicle body front section reinforcing member that continuously couples a vehicle interior on-floor member provided in accordance with the lower end root of each of the front side members to a vehicle front end part of a side sill.

11. The vehicle body front section structure according to claim 4, comprising:
a fourth vehicle body front section reinforcing member that continuously couples a vehicle interior on-floor member provided in accordance with the lower end root of each of the front side members to a vehicle front end part of a side sill.

* * * * *